United States Patent [19]
Young

[11] Patent Number: 6,006,236
[45] Date of Patent: Dec. 21, 1999

[54] VIRTUAL NAVIGATOR THAT PRODUCES VIRTUAL LINKS AT RUN TIME FOR IDENTIFYING LINKS IN AN ELECTRONIC FILE

[75] Inventor: Jeffrey E. Young, San Jose, Calif.

[73] Assignee: Adobe Systems Incorporated, San Jose, Calif.

[21] Appl. No.: 08/995,313

[22] Filed: Dec. 22, 1997

[51] Int. Cl.[6] ..................................................... G06F 17/30
[52] U.S. Cl. ............................................................ 707/103
[58] Field of Search ....................... 707/1–5, 10, 100–104, 707/200–206; 345/356, 357, 134, 132; 395/200.33, 200.52; 364/131, 132, 221.9, 222, 228, 229, 139

[56] References Cited

U.S. PATENT DOCUMENTS 5,877,766  3/1999  Bates et al. ............................. 345/357

*Primary Examiner*—Ruay Lian Ho
*Attorney, Agent, or Firm*—Fish & Richardson P.C.

[57] ABSTRACT

A method and apparatus for identifying links in an electronic document provides an electronic file as a data structure having components and having base links that define the structural relationship between the components, traverses the data structure using the base links, and produces a virtual link between two components by recognizing a characteristic shared by the components. The virtual link is identified when needed at run-time. A function may be performed using the components as components are identified.

21 Claims, 5 Drawing Sheets

VIRTUAL NAVIGATOR THAT PRODUCES VIRTUAL LINKS AT RUN TIME FOR IDENTIFYING LINKS IN AN ELECTRONIC FILE

BACKGROUND OF THE INVENTION

This invention identifies components in an electronic file.

An electronic document typically has information content, such as text, graphics, and tables, and formatting content that directs how to display the information content. Document publishing systems, which include word processing systems and desktop publishing systems, may store electronic documents as hierarchical data structures. Such structures represent the information content and formatting content as nodes connected to one another in an ordered arrangement.

A system traverses a data structure to gather data about the structure and to perform operations using that data. To traverse a hierarchical structure, the system follows a set of links from one node to another.

The links between the nodes are sometimes described in terms of family relationships. A node attached to and above another node in the hierarchical structure is referred to as the parent of the latter node. A node attached to and below another node in the hierarchical structure is referred to as the child of the latter node. Nodes having the same parent are referred to as siblings.

In addition to specifying nodal relationships in terms of familial links, systems may identify the relationship between nodes in terms of next and previous links. Next and previous links ignore the familial relationships and deal with incremental positions of nodes within a document.

Familial links, and next and previous links will be referred to as "base links." The base links connect every node in the structure and define the structure's hierarchy. A system uses the base links to traverse the structure and discover the structure's organization. The structure's organization determines the order of processing for certain types of operations. For example, a spell checker may use the base links to examine each word in an electronic document from the beginning to the end of the document. The structure's organization also determines which nodes share behavior characteristics with other nodes. For example, a node may define paragraph characteristics that are inherited and refined by descendent nodes.

Other than a set of base links that connect all nodes in a hierarchical data structure, a system can have sets of direct links to connect nodes in the same or in different branches of a hierarchical data structure. Direct links locate nodes that may have an effect upon each other under a certain set of circumstances. For example, if an author inserted a numbered section heading into a document, the system could use one set of direct links between numbered section heading nodes to find and renumber all subsequent section headings. Direct links are also useful in other situations, for example to identify components of a detailed outline, identify components of a brief outline, locate all index markers, and locate all bibliographic references.

SUMMARY OF THE INVENTION

In one aspect, the invention is directed to a computer-implemented method for identifying links in an electronic file that is expressed as a data structure having components and base links. The base links define a structural relationship between the components. The method of the invention traverses the data structure using the base links and produces a virtual link between components in the data structure by recognizing a characteristic shared by the components.

The virtual link is identified when needed at run-time. A function, such as a renumbering function or a function that generates text, may be performed using each component that is virtually linked to another component.

A plurality of traversal routines can sequentially execute to identify a virtual link between components. The data structure can be hierarchical and the traversal path used by the traversal routines can be expressed in terms of family, next, and previous structural relationships.

Among the advantages of the invention are one or more of the following. The invention only requires one set of base links. Eliminating all other links between components (e.g., direct links) eliminates the need to regenerate those other links when the structure is altered. Furthermore, memory requirements are reduced because multiple sets of links are not stored.

BRIEF DESCRIPTION OF THE DRAWINGS

The foregoing features and other aspects of the invention will become more apparent from the drawings taken together with the accompanying description, in which.

DETAILED DESCRIPTION

Figure 1:
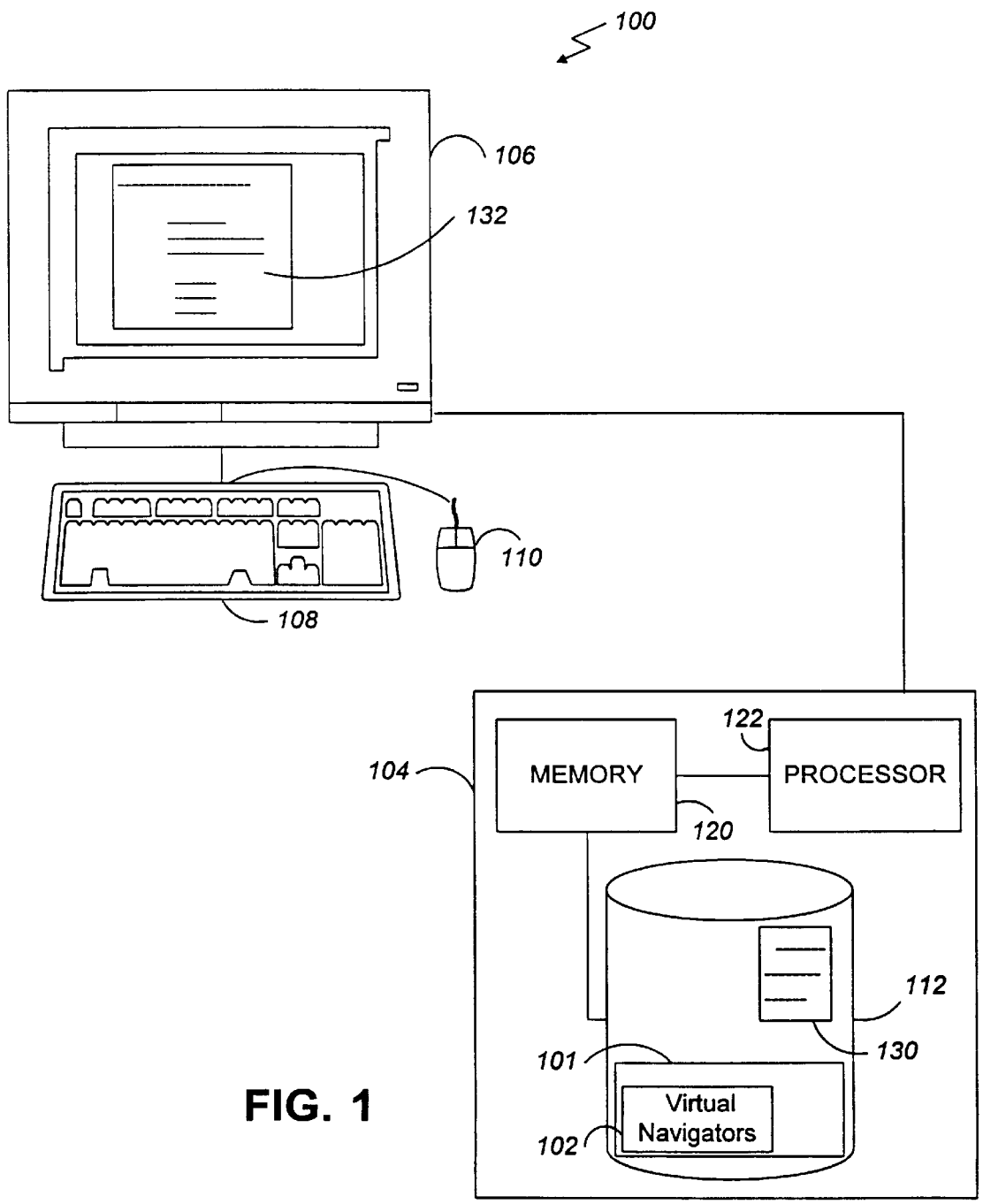
FIG. 1 is a block diagram of a computer platform suitable for supporting virtual navigators in accordance with the invention.

Referring now to FIG. 1, a computer platform 100 suitable for supporting an electronic document publishing system 101 is shown. The electronic document publishing system 101 includes one or more virtual navigators 102 on disk or in main memory. The computer platform 100 includes a digital computer 104, a display 106, a keyboard 108, a mouse or other pointing device 110, and a mass storage device 112 (e.g., hard disk drive, magneto-optical disk drive, or floppy disk drive). The computer 104 includes memory 120, a processor 122, and other customary components, such as, memory bus and peripheral bus (not shown).

An electronic document 130 contains information stored on a hard disk or other computer-readable medium such as a diskette. A human-perceptible version of the electronic document 132 is viewable on the computer display 106 or as a hardcopy printout obtained through operation on the electronic document by a computer program.

Figure 2:
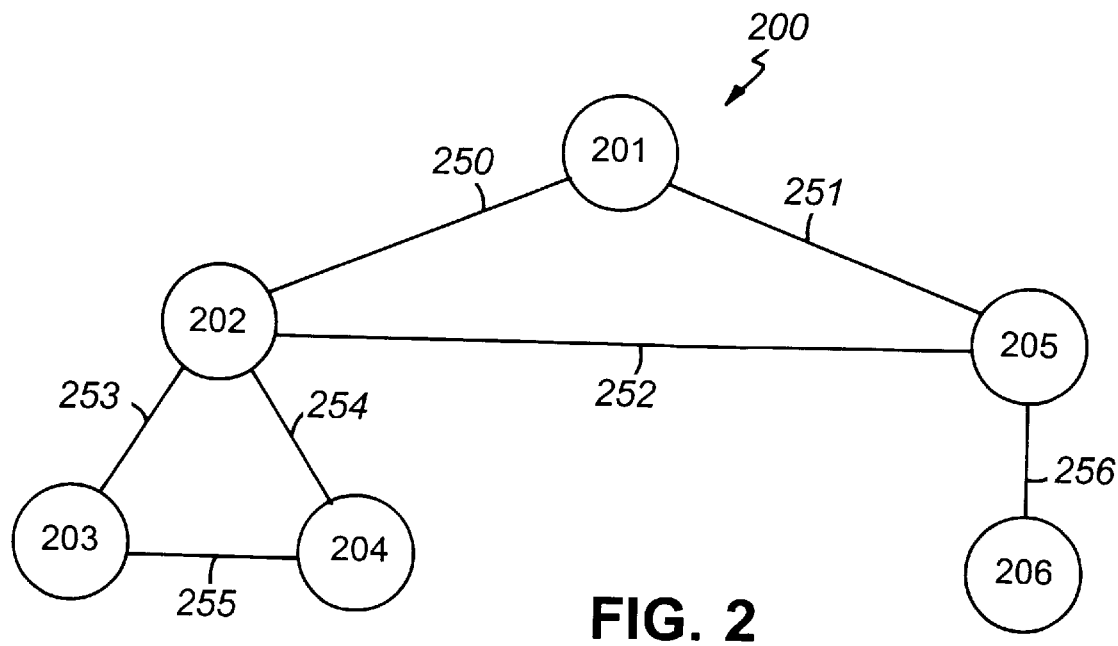
FIG. 2 is a diagram of a hierarchy of components in an electronic document.

Referring now to FIG. 2, a group of components 201–206 organized as a hierarchical data structure 200 is shown. The data structure 200 represents an electronic document. The components may be section headings, paragraphs, list items, and so forth. For example, component 202 and component 205 may be paragraphs, components 203 and 206 may be footnotes, and component 204 may be an index entry.

The electronic document publishing system 101 uses base links to identify the interrelationship of all of the components in the hierarchical structure. Solid lines 250–256 between nodes 201–206 in FIG. 2 depict the familial, next, and previous links of the data structure 200. The familial links and the next and previous component links may be specified and stored as attribute/value pairs with each component. For example, an attribute may be a parent link or a child link and a value may be a pointer to a parent node or child node.

Rather than storing and maintaining additional links, such as direct links, the system 101 uses virtual navigators 102 (FIG. 1) to locate specific components in the data structure. A virtual navigator is a software routine. As the name implies, a virtual navigator identifies an apparent path between components by traversing the data structure through the base links.

Figure 3A:
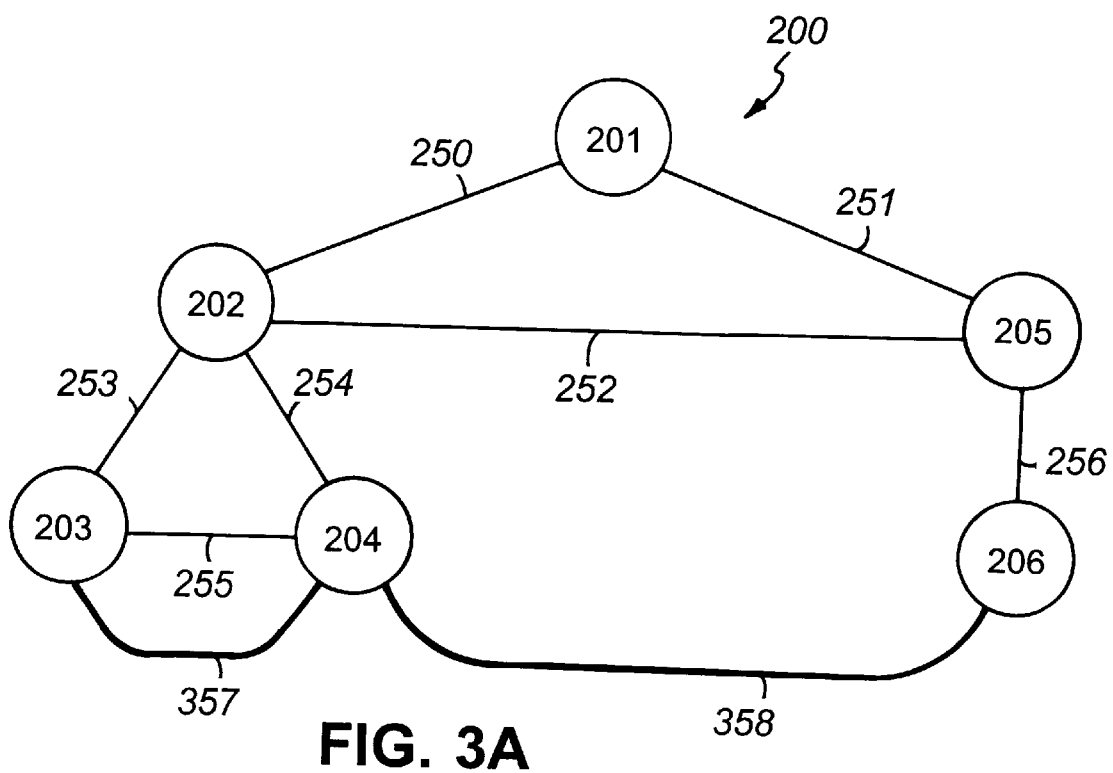
FIG. 3A is a diagram showing base links and virtual links.

Shown in FIG. 3A are apparent path 357 and apparent path 358 between footnote component 203, index component 204, and footnote component 206. Footnotes 203 and 206 and index component 204 share the characteristic that they are anchored to another component, such as a paragraph, and are both a type of anchor component. An anchor virtual navigator produces the virtual link 357 between footnote component 203 and index component 204 by using base link 255, and produces the virtual link 358 between index component 204 and footnote component 206 by using base link 254, base link 252, and base link 256.

Figure 3B:
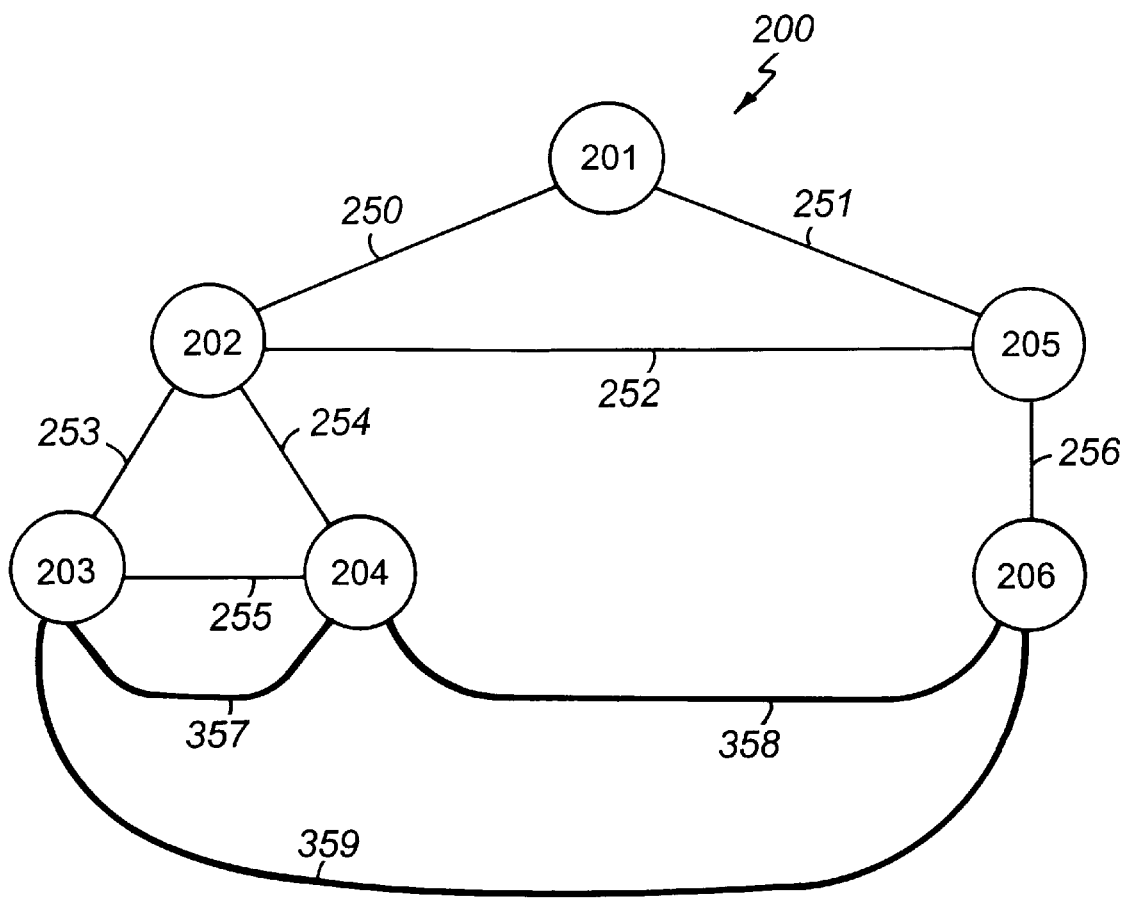
FIG. 3B is a diagram showing base links and virtual links.

Shown in FIG. 3B is a virtual link 359. Virtual link 359 is derived from virtual link 357 and virtual link 358. The footnote virtual navigator produced virtual link 359 using virtual link 357 and virtual link 358, which the anchor virtual navigator produced.

The electronic document publishing system 101 provides a virtual navigator for each type of component that needs to be identified. Examples of virtual navigators 102 include a footnote virtual navigator that locates all footnotes, an ordered-list virtual navigator that locates all ordered lists, a numbered paragraph virtual navigator that locates all numbered paragraphs, and a paragraph virtual navigator that locates all paragraphs.

In an object-oriented environment, a base virtual navigator class is the class from which all other virtual navigator classes are derived and thus all other virtual navigator classes inherit features from the base virtual navigator class. Each type of virtual navigator 102 is defined by its own class and each virtual navigator 102 is an object instantiated from that class. All virtual navigators 102 can inherit and use functions defined for any ancestral virtual navigator classes.

Each virtual navigator 102 uses the base links of the hierarchical data structure or virtual links provided by other virtual navigators and identifies a set of components by recognizing common characteristics shared by the set of components. The virtual navigators 102 need not construct or store a data structure on a computer medium or in a computer memory after identifying a set of components. A chain of components is discovered dynamically and each component is used for a specific function at the time the component is discovered before the virtual navigator searches for another component in the chain.

A virtual navigator may be used when an author adds, deletes, moves, or modifies in some way, one or more components in the data structure 200. If the modification affects the way in which other components are numbered, a renumbering routine may be called to renumber affected paragraphs. That routine may use a numbered paragraph virtual navigator, a footnote virtual navigator, or both, to identify components that need renumbering.

As an example, a virtual navigator may be called when a new section heading is inserted between existing section headings in an electronic document. Thus, if a new section heading is inserted between Section 2.0 and Section 3.0, the virtual navigator identifies all numbered section headings from Section 3.0 through the end of the electronic document. When a section heading is identified, a routine, such as the routine that called the virtual navigator, renumbers the heading. Section 3.0 will become 4.0, Section 3.1 will become 4.1, and so on.

The virtual navigators 102 use protocols based on traversal methods that obtain the parent, next child, previous child, first child, last child, and next and previous components. Each virtual navigator 102 implements at least one traversal routine tailored to a specific type of component and considers the linkage requirements for the component type. For example, a numbered paragraph virtual navigator has three traversal routines, "GetParent", "GetNext", and "GetPrev", that recognize a numbered paragraph component. A paragraph virtual navigator has traversal routines "GetParent", "GetNext", "GetPrev", "GetNextChild", "GetPrevChild", "GetFirstChild", and "GetLastChild" that recognize paragraph components.

Figure 4:
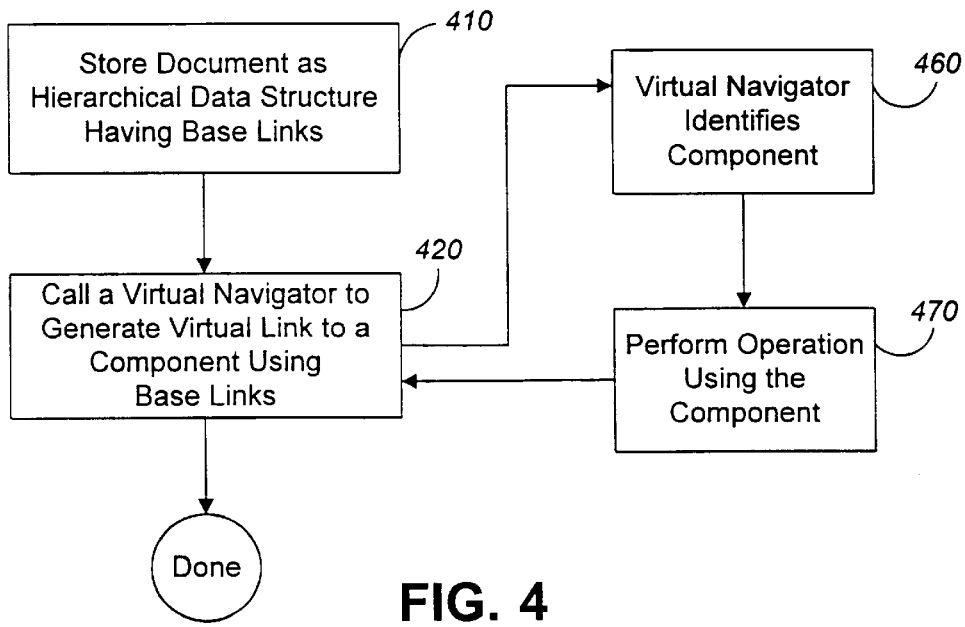
FIG. 4 is a flow chart of the context in which a virtual navigator is used.

FIG. 4 illustrates the use of a virtual navigator. First, the electronic document is stored as a hierarchical data structure 200 having base structural links (step 410). When the electronic document publishing system 101 needs to perform a task on particular components, a virtual navigator is called to identify the components. A link between identified components is not stored, so the virtual navigator produces a virtual link between components as the components are identified (step 420). The virtual navigator derives the virtual link by calling other virtual navigators. The virtual navigators use the base links, which may simply be pointers from one component to another, of the hierarchical data structure to identify the particular set of components.

To derive a virtual link, a virtual navigator identifies a component having a specific characteristic (step 460), which will be discussed. The routine that called the virtual navigator may perform an operation using the identified component (step 470). After the operation is performed, the virtual navigator may be called again to search for another component having the specified characteristic. The cycle of calling the virtual navigator and performing a function is repeated until the calling routine determines that all components were identified. For example, the calling routine may need the entire hierarchical data structure traversed or only need to identify components in a specific branch.

Due to similar linkage requirements, virtual navigators 102 call other virtual navigators that identify other types of components. Together, the virtual navigators can traverse the entire hierarchical data structure via the base links. For example, an ordered-list component requires a numbered paragraph component to be its parent component, and a numbered paragraph component requires a paragraph component to be its parent. In this case, an ordered-list virtual navigator calls a numbered paragraph virtual navigator, and the numbered paragraph virtual navigator calls the paragraph virtual navigator.

Figure 5:
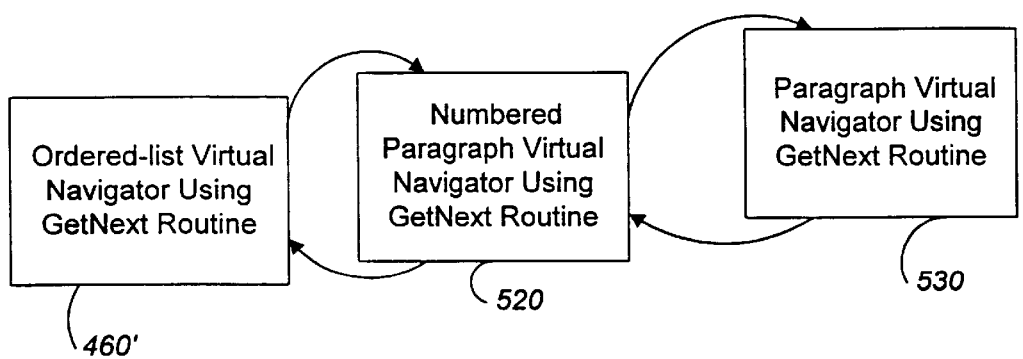
FIG. 5 is an illustration of the cascading virtual navigators.

Shown in FIG. 5 is a conceptual representation of three virtual navigators interacting with one another to identify ordered-list components using GetNext traversal routines. An ordered-list class is derived from a numbered paragraph class and a numbered paragraph class is a class derived from a paragraph class. The ordered-list virtual navigator obtains the next ordered-list component (step 460') by sequentially obtaining the next numbered paragraph until an ordered-list component is found (step 520). To obtain the next numbered paragraph, the numbered paragraph virtual navigator sequentially gets the next paragraph until a numbered paragraph is found (step 530). This cascading effect can continue up to the virtual navigator that identifies a component in the class from which all component classes are derived.

Figure 6:
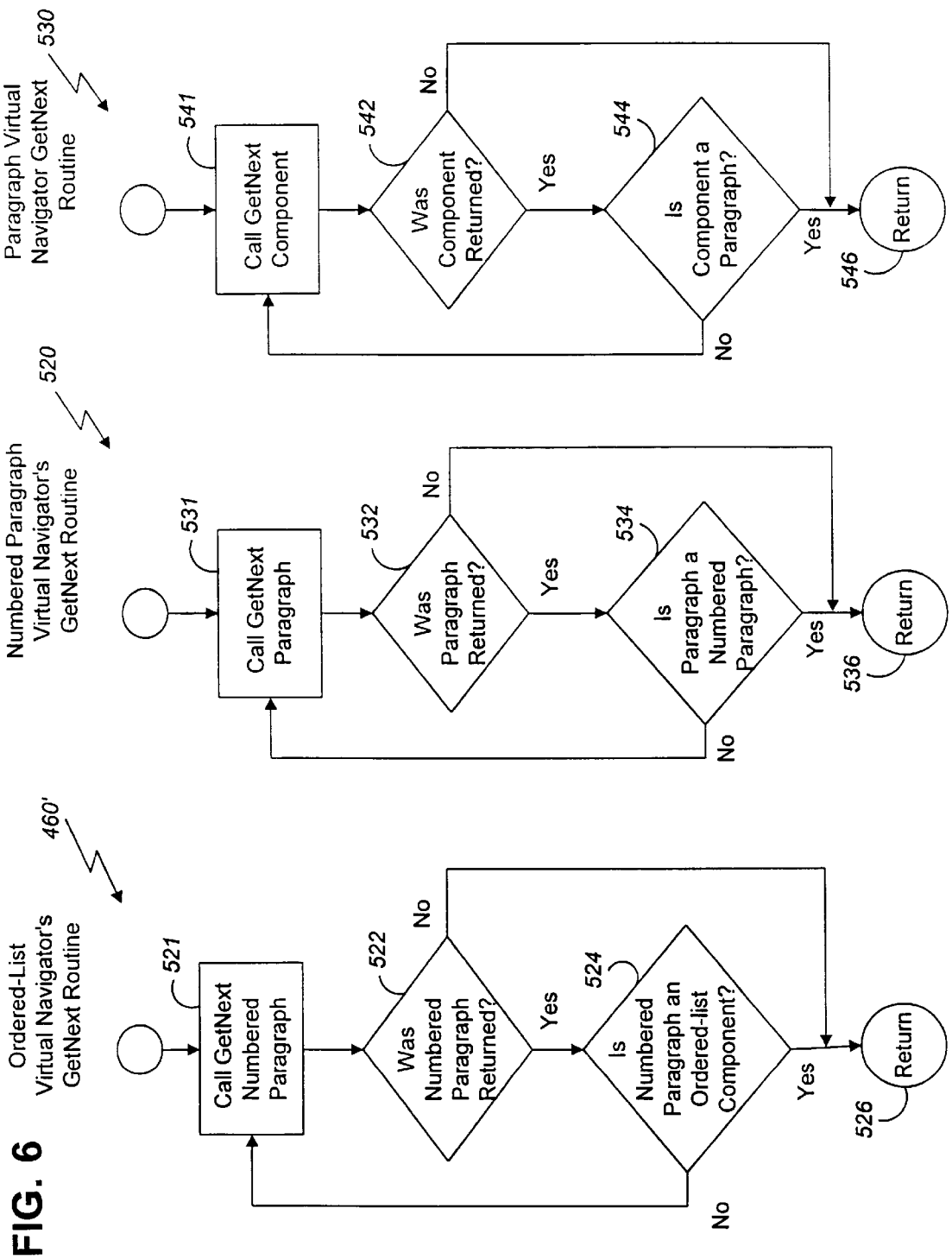
FIG. 6 is a flow chart of the ordered-list virtual navigator.

Referring to FIG. 6, is an illustrative example of the ordered-list virtual navigator's GetNext traversal routine 460' identifying components that are ordered lists. The ordered-list virtual navigator's GetNext routine 460' begins by getting the next numbered paragraph in the structure (step 521). The ordered-list virtual navigator's GetNext routine 460' calls the numbered paragraph virtual navigator's GetNext routine 520 (step 521). The ordered-list virtual navigator tests whether a numbered paragraph was returned (step 522) and whether the numbered paragraph is an ordered-list component (step 524). If an ordered-list component was returned, the ordered-list virtual navigator returns (step 526) and the calling routine can perform a prescribed function using the ordered-list component. For example, the function may increment a section number. If a numbered paragraph was returned, but it was not an ordered-list component, the ordered-list virtual navigator continues to search for an ordered-list component. If a numbered paragraph was not returned, the entire structure was traversed and the ordered-list virtual navigator returns to the calling routine (step 526).

Getting the next numbered paragraph follows a similar technique. To obtain the next numbered paragraph, the numbered paragraph virtual navigator's GetNext traversal routine 520 calls the paragraph virtual navigator's GetNext traversal routine 530 (step 531), tests whether a paragraph was returned (step 532), and if a paragraph was returned, tests whether the paragraph is a numbered paragraph (step 534). If the paragraph was not a numbered paragraph, the numbered paragraph virtual navigator's GetNext routine 520 repeats steps 531–534 until a numbered paragraph is returned or the numbered paragraph virtual navigator has traversed the structure.

To get the next paragraph, the paragraph virtual navigator obtains the next component because a paragraph is derived from a component. The paragraph virtual navigator's GetNext routine 530 is called to obtain the next component. The paragraph virtual navigator's GetNext routine calls the component virtual navigator's GetNext traversal routine (step 541) and tests whether a component was returned (step 542), and if so, whether the component is a paragraph (step 544). If the component was not a paragraph, the paragraph virtual navigator's GetNext routine repeats steps 541–544 until a paragraph is returned or the paragraph virtual navigator has traversed the structure.

Other embodiments are within the scope of the following claims. Rather than one virtual navigator calling another virtual navigator, a virtual navigator can include the functionality of several virtual navigators. Additional object classes (e.g., containers), traversal functions, and navigators may be implemented. Virtual navigators can produce virtual links for linked data structures other than hierarchical data structures. Other functions may be performed after a component is identified, including generating bibliographies, endnotes, tables of contents, and indices.

What is claimed is:

1. A computer-implemented method for identifying links in an electronic file that is expressed as a data structure having a plurality of components and base links that define a structural relationship between the components, the method comprising:

traversing a data structure using a plurality of base links; and producing at run time, a virtual link between a first component and a second component in the data structure by recognizing a characteristic shared by the first component and the second component.

2. The method of claim 1, wherein the virtual link is produced as needed.

3. The method of claim 1, further comprising:

performing a function using the second component before the traversal of the data structure is completed.

4. The method of claim 1, further comprising:

providing a plurality of traversal routines that sequentially execute to identify a virtual link between components.

5. The method of claim 1, wherein the second component inherits features from a component class, and a traversal routine recognizes the second component by recognizing members of the component class until the second component is found.

6. The method of claim 5, wherein the data structure is a hierarchical data structure and the traversal routine specifies a traversal path in terms of family, next, and previous structural relationships.

7. The method of claim 3, wherein the electronic file is an electronic document.

8. The method of claim 7, wherein the function performed on the second component is a renumbering function.

9. The method of claim 7, wherein the function performed on the second component generates text.

10. The method of claim 7, wherein the function performed on the second component locates a text string.

11. The method of claim 7, wherein the traversal routine identifies a plurality of virtual links between components.

12. The method of claim 11, wherein the data structure is a hierarchical data structure, the virtual links represent a hierarchical subset of components in the hierarchical data structure, the traversal routine specifies a traversal path in terms of family, next, or previous structural relationships, and the traversal routine specifies components according to data type.

13. A computer-implemented method for identifying links in an electronic file at run time, comprising:

providing an electronic file as a hierarchical data structure having a plurality of components and a plurality of base links that define a structural relationship between the components;

traversing the hierarchical data structure using a plurality of traversal routines that use the base links;

defining the traversal routines as classes that inherit features from other traversal routine classes;

using each traversal routine to identify a plurality of links between a plurality of components in the hierarchical data structure by recognizing a characteristic shared by the components; and performing a function using each identified component at the time the component is identified.

14. A computer program operating on an electronic file arranged as a data structure having a plurality of components and a plurality of base links that define a structural relationship between the components, the computer program residing on a computer-readable medium, comprising instructions causing a computer to:

provide at least one traversal routine, with the traversal routine identifying, at run time, a link between a first component and a second component in a data structure by traversing the data structure using the base links.

15. The computer program of claim 14, wherein the second component inherits characteristics from a class of components and the traversal routine identifies the link by recognizing members of the class of components.

16. The computer program of claim 14, further comprising the instruction causing a computer to:

perform a function using the second component at the time the component is identified.

17. The computer program of claim 14, wherein the electronic file is an electronic document.

18. The computer program of claim 17, further comprising the instruction causing a computer to:

produce a plurality of links between a plurality of components in the data structure.

19. The computer program of claim 17, further comprising the instruction causing a computer to:

perform a function using the second component and subsequently linked components before traversal of the data structure is completed.

20. The computer program of claim 19, wherein the function performed is a renumbering function.

21. The computer program of claim 19, wherein the function performed generates text.

* * * * *